United States Patent [19]

Ritchey

[11] Patent Number: 5,493,997
[45] Date of Patent: Feb. 27, 1996

[54] BIRD NESTING APPARATUS

[76] Inventor: Eugene B. Ritchey, 13821 Sable Blvd., Brighton, Colo. 80601

[21] Appl. No.: 322,181

[22] Filed: Oct. 12, 1994

[51] Int. Cl.$^6$ .................................................. A01K 31/00
[52] U.S. Cl. ................................................................ 119/23
[58] Field of Search ................................ 119/15, 23, 17, 119/52.2, 52.3, 57.8, 57.9

[56] References Cited

U.S. PATENT DOCUMENTS

| | | | |
|---|---|---|---|
| 3,211,130 | 10/1965 | Prince | 119/23 |
| 3,282,251 | 11/1966 | Dahmus | 119/23 |
| 3,643,631 | 2/1972 | Wade et al. | 119/23 |
| 3,792,685 | 2/1974 | Wiener | 119/23 |
| 4,846,110 | 7/1989 | Reynolds | 119/23 |
| 4,881,491 | 11/1989 | Brown | 119/51.01 |
| 4,892,060 | 1/1990 | Lundquist | 119/52.2 |
| 4,928,631 | 5/1990 | Smith | 119/23 |
| 4,953,503 | 9/1990 | Lundquist | 119/23 |
| 5,016,571 | 5/1991 | Totaro | 119/23 |
| 5,170,747 | 12/1992 | Strangio | 119/15 X |

FOREIGN PATENT DOCUMENTS 516266  12/1939  United Kingdom ..................... 119/23

*Primary Examiner*—Thomas Price
*Attorney, Agent, or Firm*—Fields, Lewis & Rost

[57] ABSTRACT

A bird nesting box is disclosed for viewing the nesting behavior of birds. The apparatus includes a housing with an opening and a perch. The back wall of the housing is transparent to allow viewing the interior area of the housing. The roof of the housing is preferably translucent to increase the natural lighting of the interior area. For safe and convenient viewing, the bird nesting box is removably attachable to the outside facing surface of a window pane with suction cups. An opaque cover is removably attachable to the inside facing surface of the window pane. In one orientation, the cover entirely covers the transparent back wall. A view port in the cover allows for partial viewing of the inside area with the cover in this orientation. In a second orientation, the cover uncovers the back wall for complete viewing of the interior area. In another embodiment, the housing is supported above the ground by a post. The back wall is transparent hand has a frame. An opaque cover is hinged to the frame and can be swung open to allow for viewing of the interior area through the transparent back wall. Rings of different inner diameters may be snapped into the opening to selectively change the effective size of the opening to accommodate different species of birds.

16 Claims, 3 Drawing Sheets

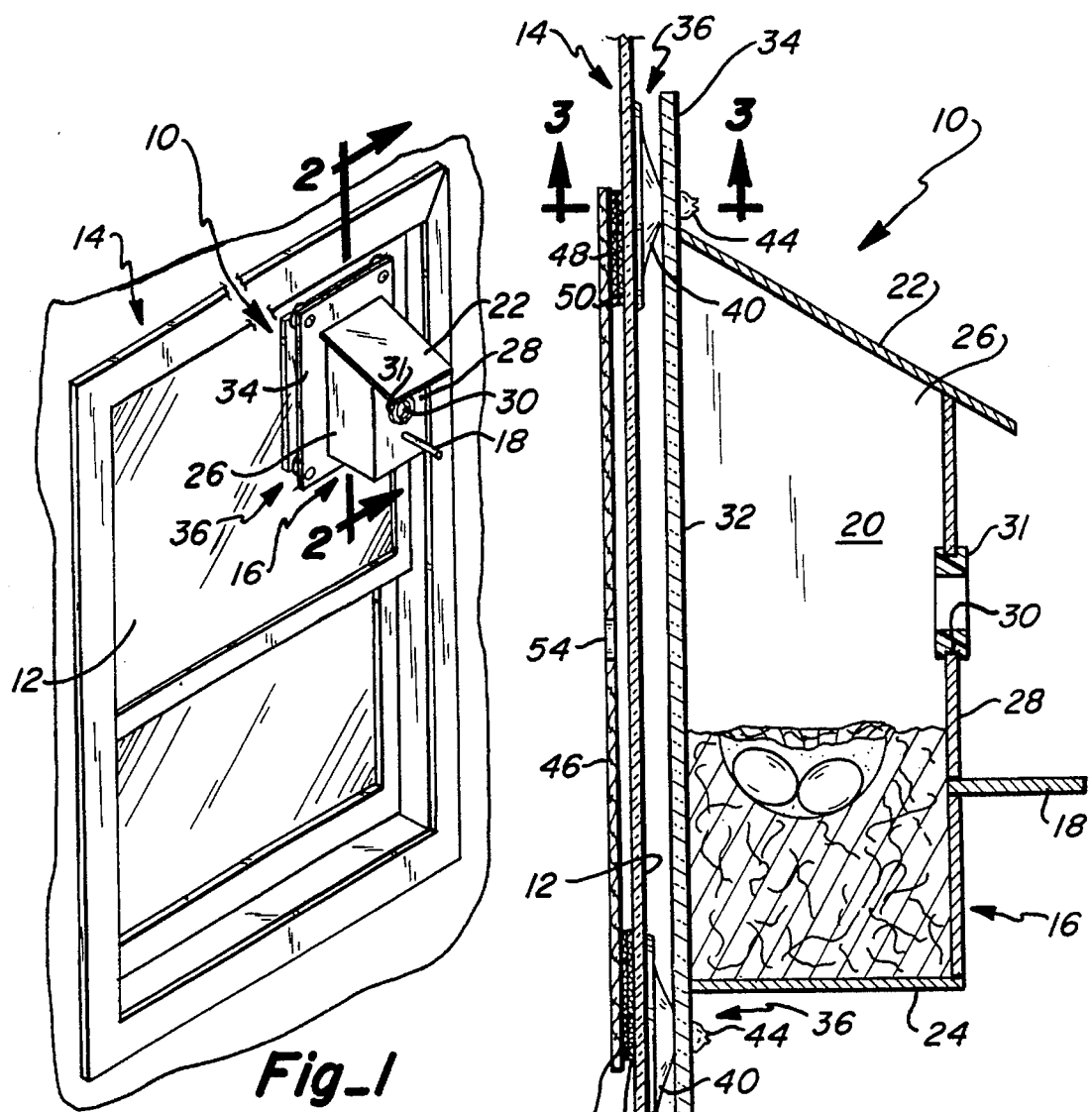
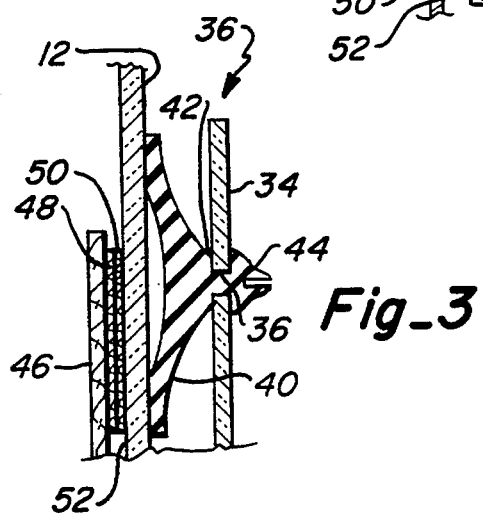
Fig_1
Fig_2
Fig_3

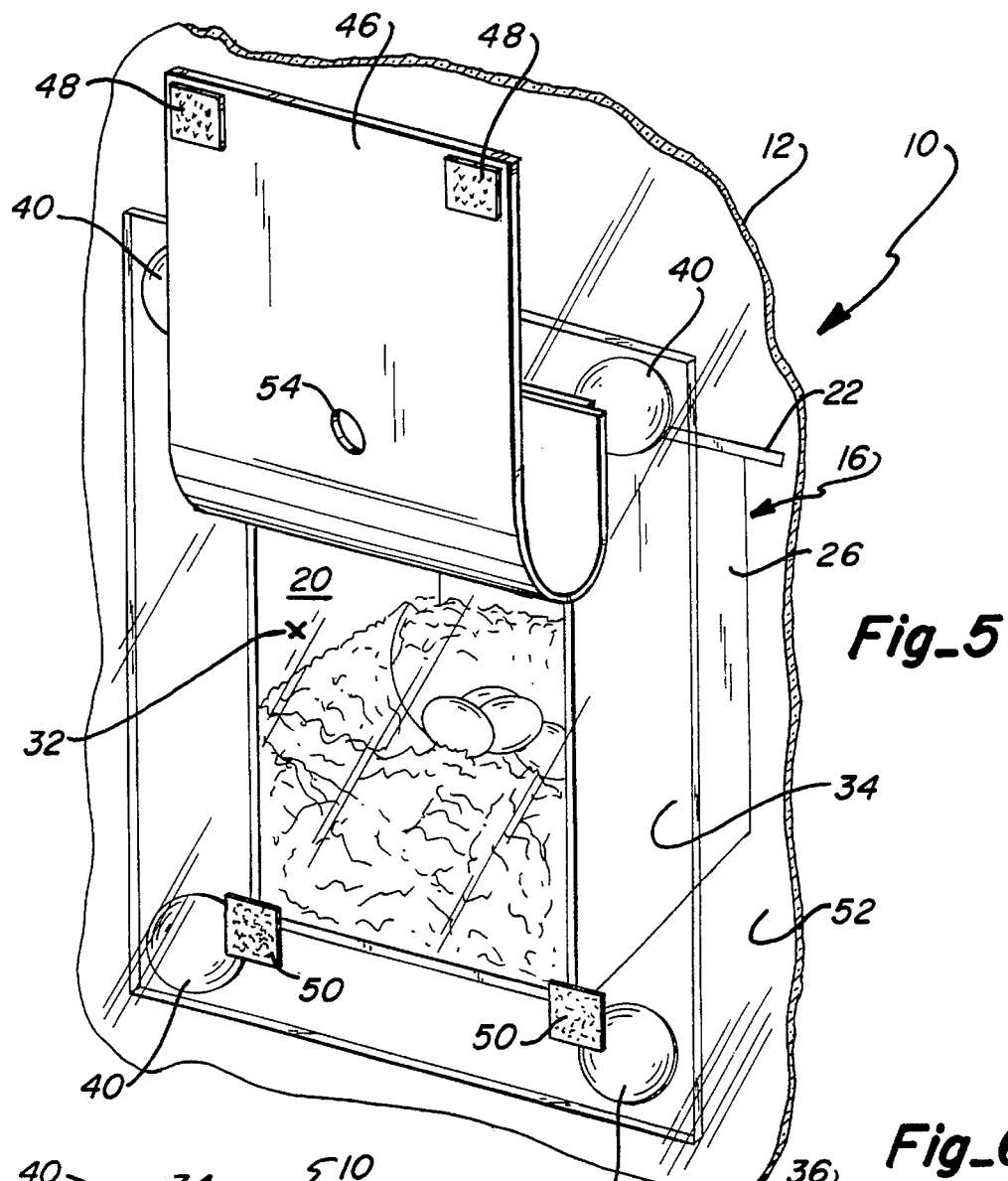
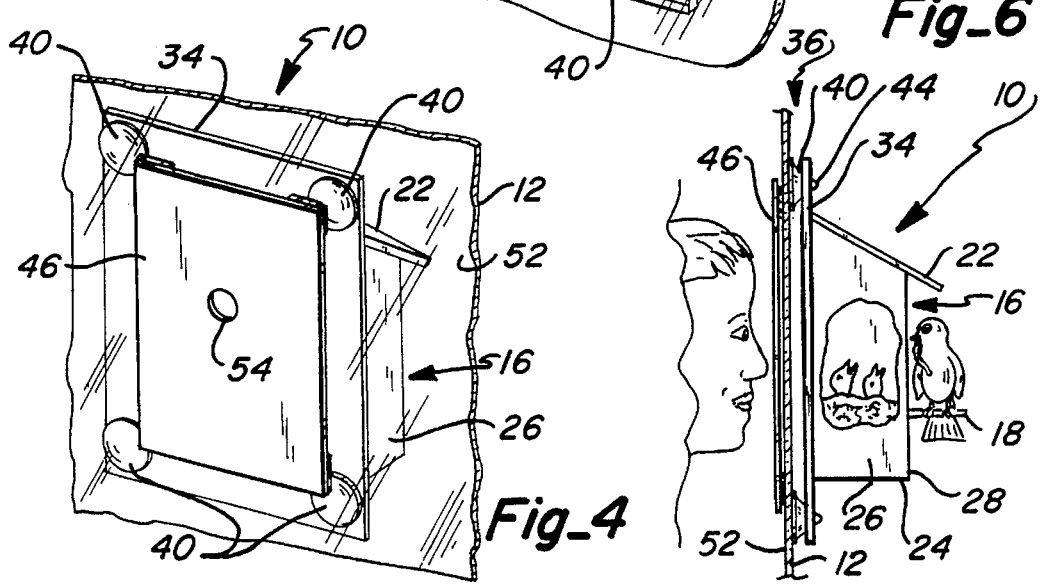
Fig_5
Fig_4
Fig_6

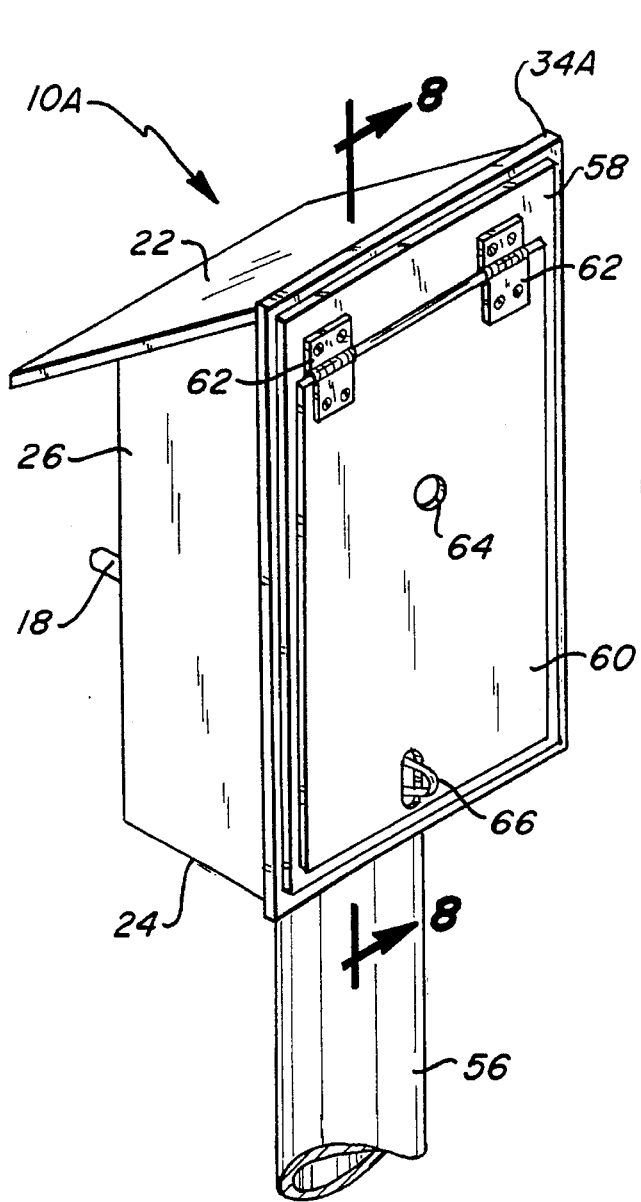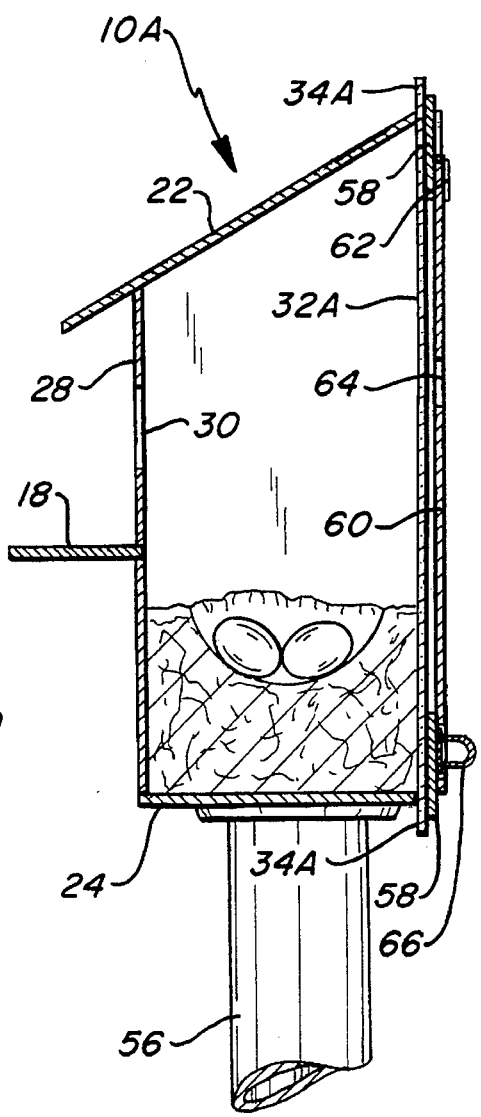
Fig_7
Fig_8

BIRD NESTING APPARATUS

TECHNICAL FIELD

This invention relates generally to birdhouses and, more particularly, to a bird nesting box within the above mentioned class having a viewing window.

BACKGROUND OF THE INVENTION

Birdhouses have long played a part in popular culture and the art is replete with numerous designs thereof. The popularity of birdhouses stems from a desire in the people employing them for interaction with the birds which inhabit their locale. Birdhouse owners, particularly, enjoy the sights and sounds of the birds which are attracted into nesting in the provided birdhouse(s). Therefore, birdhouse owners usually keep the birdhouse(s) within visual and aural distance of their residence. Favorite placings for a birdhouse typically include hanging the birdhouse from a front yard or back yard tree or mounting the birdhouse to a nearby fence post.

Conventional birdhouses are characterized by having a housing and a perch. A typical birdhouse housing includes a back wall, opposed sidewalls, a front wall, a floor and a roof. The front wall typically has an entrance opening therein which is sized and configured to allow a bird to pass through into the interior of the housing.

The perch typically extends from the front wall, below the opening, to act as a landing platform for the bird. Any portion of the birdhouse roof which extends forward of the front wall typically extends less forward than the perch so as to not obstruct the landing of the bird.

Thus, once the bird has landed on the perch and stabilized itself by gripping the perch with the toe(s) of each tarsus, the bird may enter the birdhouse through the entrance opening. Typically, the bird will bring in straw, twigs, or other nesting material into the housing and build a nest therein. Once the nest has been built, the bird will typically lay an egg(s) therein and bring it to hatching, that being the primary reason to build the nest. Afterwards, the bird will typically feed and nurture the chick in the nest built in the birdhouse. The birdhouse, thus, offers a valuable teaching opportunity, long overlooked, to teach young and old alike the nesting and nurturing behavior of birds.

Some conventional birdhouses have a hinged construction for their roofs to allow the roofs to be opened for cleaning the interior of the housing portion. The cleaning of the birdhouse is typically conducted after the birds have left their nest therein. As such, this conventional birdhouse construction is not suited to allow a person to observe the natural activity therein without substantially interfering with it. An attempt to view the natural activity of the birds by simply opening the roof would cause disturbance and alarm to the birds in the birdhouse, and pose a risk of injury to the person attempting the viewing. Thus, while suitable for their intended purpose, these conventional birdhouses have not sufficiently evolved in their design to exploit this teaching opportunity.

A need exists for a birdhouse which, in addition to offering a way to keep birds nearby for aesthetic purposes, has a construction which allows a person to directly witness the birth preparation, birth, and nurturing activities of bird(s) nesting therein without substantially interfering with these natural activities. It would further be beneficial if such a birdhouse could be placed in a location which was both convenient and safe for such viewing. It would additionally be beneficial if the birdhouse could allow selective viewing to further reduce the impact by the observer to the viewed events. It is, therefore, an object of the present invention to provide a birdhouse having the aforementioned characteristics and capable of acting as a teaching tool to teach the reproductive and nesting behavior of birds.

DISCLOSURE OF THE INVENTION

In view of the foregoing, a bird nesting box has been provided in accordance with the present invention which acts as a teaching tool for teaching the nesting and nurturing behavior of birds. More specifically, the bird nesting box of the present invention allows a person to safely and conveniently view the natural behavior of birds such as nest building, egg laying, egg hatching, feeding and nurturing behavior of birds without substantially impacting these natural behaviors.

In its broadest sense, the bird nesting box includes an enclosed housing which provides an interior area within which a bird may nest, and a perch upon which a bird may land.

The housing includes a front wall, a back wall, opposed side walls, a floor, and a roof. The front wall further defines an opening therein which is sized and configured to allow a bird to pass into the housing's interior. The perch extends forwardly from the front wall from a point below the opening so that a bird can enter the opening from the perch.

In accordance with an important aspect of the present invention, a portion of the housing is transparent through which the interior area of the housing may be viewed. Preferably, at least one of the other housing elements is translucent to increase the natural light level in the interior area for better viewing.

Furthermore, means are provided for opaquely covering the transparent housing portion in a first selected orientation and uncovering the transparent housing in a second selected orientation. In this manner, the transparent housing does not appear transparent from the interior area of the housing when covered by the covering means in the first selected orientation.

A view port is also provided in the covering means so that the interior area may be viewed when the covering means covers the transparent window in the first orientation.

Additionally, mounting means are provided for mounting the bird nesting apparatus to a selected fixed mounting base. When mounted on the selected fixed mounting base, the bird nesting box allows for convenient and safe viewing through the transparent window.

In one preferred embodiment of the present invention, the bird nesting box is adapted for mounting to a planar surface, which is preferably an outside facing surface of a window pane. The transparent housing portion is the back wall of the housing, comprised of a flat plexiglass sheet. Suction cups are provided to removably attach the bird nesting box to the outer window surface to support the bird nesting box thereon. In this manner, the interior area of the housing may be viewed through the transparent back wall from a safe and convenient position from the other side of the window.

The covering means is removably affixed to the inside facing surface of the window pane and consists of a flexible opaque cover having a first set of swatches of hook and loop fasteners sewn thereto. A second set of provided of matable hook and loop fastener swatches are adhesively attached to the inside facing surface of the window such that they are capable of mating with the first set of swatches. When the respective swatches are mated, the opaque cover is oriented to cover the transparent window. When selective swatch sets are unmated, the opaque cover uncovers the transparent window in a second orientation. In this manner, the observer can get a full view of the interior area, which is only partially viewable through the provided view port when the opaque cover is covering the transparent housing portion.

In another preferred embodiment of the present invention, the bird nesting box is mounted at a selected height above the ground by an elongate support post attached to the floor of the housing. Once again, the transparent housing portion is the back wall, comprised entirely of a plexiglass sheet. A frame is secured to the back wall, and the covering means, provided by an opaque rigid cover, is attached to frame as by hinge means. The rigid opaque cover, likewise, capable of rotating from a first orientation to a second orientation to selectively opaquely cover and uncover the transparent back wall.

Additional advantages of this invention will become apparent from the description which follows, taken in conjunction with the accompanying drawings.

BRIEF DESCRIPTION OF THE DRAWINGS

The invention will be more readily understood by reference to the accompanying drawings wherein like reference numerals indicate like elements throughout the drawing figures, and in which:

FIG. 1 is a partial perspective view showing a bird nesting box of the present invention secured to an outside facing window pane;

FIG. 2 is an enlarged partial vertical section, take along the lines 2—2 in FIG. 1, showing the interior area of the bird nesting box of FIG. 1;

FIG. 3 is an enlarged partial horizontal section, taken along the lines 3—3 in FIG. 2, showing a suction cup head with a retaining head attached to an attachment surface provided by the back wall;

FIG. 4 is a partial perspective view showing a flexible cover removably affixed to the inside facing pane of the window and covering the back wall of the bird nesting box;

FIG. 5 is an enlarged partial perspective view showing the transparent back wall of the bird nesting box with the flexible cover uncovering the back wall;

FIG. 6 is a partial side view of the bird nesting box of FIG. 4, showing an observer looking through a provided view port in the flexible cover;

FIG. 7 is a partial perspective view of the back side of an alternate embodiment of the present invention supported on a post and having a rigid cover hinged to the back wall; and FIG. 8 is a vertical section view, taken along the line 8—8 in FIG. 7, showing the interior area of the embodiment of FIG. 7.

DETAILED DESCRIPTION OF PREFERRED EMBODIMENTS

FIGS. 1 through 6 illustrate a bird nesting apparatus, or bird nesting box, 10 of the present invention which allows the observation of the nesting behavior of birds residing therein. FIGS. 7 and 8 illustrate an alternate embodiment 10A of the present invention and will also be described herein.

As seen in FIGS. 1–6, the bird nesting box 10 of the present invention is adapted to be secured to the outside facing window pane 12 of a window 14. However, as shown, the bird nesting box 10 also includes a number of elements conventional to most birdhouses such as a housing 16 and a perch 18.

The housing 16 provides an interior area 20 which is partially defined by a roof 22, a floor 24, a pair of opposed side walls 26 and a front wall 28. The roof 22, floor 24, side walls 26 and front wall 28 are formed from a suitable housing material, such as wood or plastic, and may come in any number of colors or aesthetic shapes.

Neither the material from which these conventional elements are made, nor their aesthetic shapes are generally critical to the present invention so long as their arrangement results in a defined enclosure forming the interior area 20. These conventional elements are typically opaque, so that the interior of the birdhouse generally cannot be seen through the material from which they are made. This need not be modified in the practice of the present invention except as detailed herein. It is contemplated that the walls of the housing may be curved, rather than flat, so that the housing configuration is cylindrical, or oval, and that the walls may be integral with each other. It is important, only, that the housing be enclosed.

As best shown in FIGS. 1 and 2, a conventional entrance, or opening, 30 is defined in the front wall 28. The opening is located vertically on the front wall 28 at a suitable location as shown in FIG. 2, so that a nest can be built within the housing 16 without covering the opening 30. The opening 30 is sized and configured to allow a bird to pass therethrough. As will be appreciated, the specific size of the opening 30 will vary with the size of the type of bird the nesting box 10 is designed to attract. A typical size range for a conventional circular opening 30, however, will be from one to six inches in diameter.

As also shown, the perch 18 conventionally extends horizontally from the front wall 28 below (i.e., closer to the floor than) the opening 30. The perch 18 is conventionally formed from an elongated peg of suitable material, such as wood or plastic, and has one end imbedded into the front wall 28 to be supported thereby. In effect, the perch 18 provides a platform for a bird to safely land upon prior to entering the bird nesting box 10 through the opening 30. As will also be conventionally understood, the distance that the perch 18 will be spaced below the opening 30 will vary somewhat, depending on the size of bird for which the bird nesting box 10 is designed. Having described the conventional aspects to the bird nesting boxes 10 and 10A of the present invention, the modifications and additions embodying the substance of the present invention will now be described. Conveniently, the size of opening 30 can be modified by snapping a ring, such as ring 31 shown in FIG. 2, into opening 30 to reduce the effective size of the opening. Rings having different inside diameters can be provided so that nesting box 10 can accommodate different species.

In accordance with an important aspect of the present invention, a back wall 32 is provided which, when combined with the roof 22, the floor 24, the opposed side walls 26 and the front wall 28, completes the housing portion 16 and provides a transparent housing portion through which the interior area 20 may be observed.

As best shown in FIG. 5, in the bird nesting box 10 of the present invention, the entire back wall 32 is formed from a single planar sheet of transparent material, such as plexiglass, so that the viewable interior area 20 is thus maximized.

An attachment surface, or frame, 34 extends from the back wall 28 and is provided by a portion of the plexiglass sheet in excess of that necessary to form the back wall 32. Thus, the attachment surface 34 defines a rectangular frame around the back wall 32. It is contemplated, however, that the frame 34 need not be integral with the back wall 32. For example, the transparent back wall 32 could also be rigidly connected to an independent frame 34. Furthermore, it will be understood that it is not necessary that the attachment surface 34 itself be transparent. Thus, the attachment surface 34 suitably also comprises a wood or opaque plastic frame. It will yet further be understood that the back wall 32 itself could act as the attachment surface 34. However, as will be presently appreciated, such would not be preferable since the viewable interior area 20 would be diminished.

Preferably, in order to augment the natural brightness within the interior area 20 of the housing 16, at least one of the other housing elements, such as the housing roof 22, is comprised of a translucent material. One suitable translucent material is a white translucent plastic. Moreover, it is contemplated that any of the other housing walls 26, 28, or the housing roof 22, or floor 24 could also be comprised of transparent material. However, in the practice of the present invention, the transparent back wall 28 is preferably only used for viewing to maintain the safety of the observer. Additionally, it is the present belief of the inventor that a transparent front wall 28 could be confusing to a bird and could lead the bird to accidentally crashing thereinto.

As shown in FIGS. 1–6, and as best seen in FIG. 5, the bird nesting box 10 is capable of being removably affixed to an outside facing surface of the window pane 12. In effect, the bird nesting box 10 is mounted to window pane 12 with the window pane 12 acting as a fixed mounting base for the bird nesting box 10.

More particularly, the mounting means is provided by four suction cups 36, one suction cup 36 located in each corner of the frame 34 and connected to the frame 34 through a bore 38 provided in each corner of the frame 34. Specifically, as shown in FIG. 3, each suction cup 36 has a conventional suction cup head 40 and an elongate member 42. The elongate member 42 extends from the suction cup head 40 and terminates in a flat retaining end 44. The retaining end 44 extends through its respective bore 38 to securably attach the suction cup head 40 to the frame 34. Thus, each suction cup 36 extends rearwardly from the frame 34 provided by the back wall 32 and allows the bird nesting box 10 to releasably attached to and supported by the window pane 12. It will be understood that if the suction cups 36 were attached directly to the back wall 32, rather than the frame 34, they would interfere with viewing through the back wall 32. Of course, the suction cups 36 are only one type of releasable attaching means, and other means such as hook and loop fasteners could be employed to mount the bird nesting box to the window. As a further alternative, nesting box 10 can be supported directly from the window frame by a suitable mounting member (not shown) extending from and attached to the window frame.

As seen in FIGS. 1–6, and in accordance with another important aspect of the present invention, means are provided for opaquely covering the transparent window created by the back wall 32. This is important to the object of the present invention of allow a person to observe the activity within the housing 16 while minimizing the interference with such activity. In this regard, the covering means allows the transparent window created by the back wall 32 to be selectively covered and uncovered.

To this end, as best shown in FIGS. 4 and 5, an opaque flexible cover 46 is provided. One suitable material for the opaque cover 46 is a sheet of polymer based window shade material. The cover 46 may also comprise fabric or other suitable material. It will be understood that the cover 46 should be sized and configured to fully cover the transparent housing portion (e.g., the back wall 32.) The cover 46 need not necessarily be flexible, but is so for ease of use and convenience.

A swatch 48 of Velcro® hook and loop fasteners is sewn to each of the four corners of the cover 46. If the sheet 46 is lightweight, the swatches 48 need not be large; and each swatch being one inch square should suffice. A suitably sized swatch 50 of matable Velcro® hook and loop fasteners is adhesively affixed to each of four corresponding locations on the inside facing surface 52 of the window 14 so that the swatches 48 are capable of mating with a respective swatch 50. When mated, the swatches 48/50 removably affix the cover 46 to the inside facing surface 52 of the window 14 with the cover 46 oriented such that it covers the transparent window provided by back wall 32. In this first orientation of the cover 46, a provided view port 54 allows an observer to look into the interior area 20 of the housing 16 through the transparent housing portion. If the observer is satisfied that she can increase her sphere of observation into the interior area 20 without substantially interfering with the happenings therein, she can unmate the lowermost swatches 48 from their corresponding mating swatches 50, and lift the cover 46 to uncover the transparent housing portion. In this second orientation of the sheet 46, as shown in FIG. 5, she can get a more comprehensive look at the nesting activity taking place within interior area 20. It is contemplated that, at times, the mother bird may be too aware of the observer and too nervous thereby to allow the fuller observation enabled with the sheet 46 in the second orientation. The observer herself will have to determine whether the time is appropriate for second orientation type viewing. It will be appreciated that other means for removably affixing the cover 46 to the inside facing surface 52 of the window 14 could be employed, such as adhesive tape.

To use the bird nesting box 10, a person would take the bird nesting box 10 and stick it to the outside facing window pane surface 12 of window 14. Thereafter, the person would affix the swatches 50 to the inside facing window pane surface 52 of window 14 at suitable locations to cover the back wall 32. The person could then removably affix the cover 46 to the inside surface 52 by mating swatches 48 and swatches 50. Then, the person may view the interior area 20 through the view port 54, until they determine that they can lift the cover 46 without substantially interfering with any of the birds' activities going on therein.

In another embodiment of the present invention illustrated in FIGS. 7 and 8, the bird nesting box 10A is supported above the ground by an elongate cylindrical post 56, which may suitably be made from wood or plastic. The post 56 is rigidly attached to the floor 24 of the housing 16A and is of a sufficient length so that, when driven into the ground, the housing 16A is at a selected height above the ground. If desired, the post 56 could also be telescoping, so that the height above ground of the housing 16A could be easily varied to accommodate the height of an observer. Of course, no such height change should take place while birds are in the housing 16A.

As seen in FIGS. 7 and 8, the housing 16A also comprises a roof 22, floor 24, side walls 26, and a front wall 28 which also has an opening 30 defined thereby. The back wall 32A, completing the housing, is also comprised of plexiglass, or other suitable transparent material, to define a transparent window into the interior area 20. An attachment surface 34A is also created by oversizing the plexiglass sheet from that necessary just to form the back wall 32A. However, as shown, the attachment surface portion 34A, is smaller than the portion 34 in the first embodiment of the present invention. A wood frame 58 is secured, as by adhesive securing, to the attachment surface portion 34A. A flat rectangular cover 60, comprised of wood or another other suitably durable rigid opaque material, is attached, as by a pair of hinges 62 or other suitable attaching means, to the top of the wood frame 58. The cover 60 has a view port 64 bored therethrough in a generally central location. As will be appreciated, when the cover 60 is rotated to a downward orientation, the cover 60 covers the transparent window defined by the back wall 32A. The cover 60 can also be rotated to a second, upward orientation to uncover the transparent window defined by the back wall 32A, when desired. An optional locking means 66 can also be provided, if desired, to allow the cover 60 to be locked to the back wall 32A.

In use a person would drive the post 56 into the ground at a selected location until the housing 16A was at a desired height above the ground. Thereafter, the person can approach the housing 16A from behind, and view the interior area 20 through the view port 64. If the observer is satisfied that no substantial interference will result, they may then lift up the cover 60 and completely view the interior area 20. When the observer is finished viewing, they may then close cover 60, and optionally lock the cover 60 with the provided locking means 66.

From the foregoing, those skilled in the relevant art will appreciate that the present invention is capable of being expressed in many embodiments, all of which are capable of providing a transparent window to view the inside of the housing, and which may safely and conveniently be used to convert a birdhouse to a teaching tool to teach the natural behavior of birds nesting therein. It will also be readily appreciated that the present invention is well suited for commercial distribution as a kit, comprised of suitable components, for the purpose of assembly into a bird nesting box of the present invention. The kit, as will further be appreciated, is best suited to include components which can be used to assemble either of the above described embodiments of the present invention.

The foregoing detailed description of the invention has been made with reference to preferred embodiments thereof. From such description, one skilled in the art can easily ascertain the essential characteristics of this invention, and without departing from the spirit or scope thereof make various changes and modifications to adapt for various usages and conditions.

I claim:

1. A bird nesting apparatus for viewing the activity of birds nesting therein comprising:

an enclosed housing defining an interior area therein;

an opening defined in said enclosed housing, said opening sized and configured to allow a bird to pass therethrough to access said interior area;

a perch extending from said housing adjacent said opening;

a transparent housing portion of said housing for providing viewing into said interior area;

opaque covering means for selectively opaquely covering said transparent housing portion in a first selected orientation and for uncovering said transparent housing portion in a second selected orientation for viewing said interior area, said opaque covering means having a view port therethrough so that said interior area is viewable through said transparent housing portion with said covering means in said first selected orientation so that said interior area can be viewed when said opaque covering means is in either said first selected orientation or said second selected orientation with minimal interference with the activity being viewed; and means for selectively releasably attaching said housing to a first generally planar surface.

2. A bird nesting apparatus, as claimed in claim 1, further comprising:

a removable ring having an outer diameter sized to releasably hold said ring in said opening and a smaller inner diameter forming a smaller opening for accommodating birds of different species; and at least one translucent housing portion of said housing to increase the light in said interior area.

3. A bird nesting apparatus, as claimed in claim 1, wherein:

said transparent housing portion is generally flat.

4. A bird nesting apparatus, as claimed in claim 1, wherein:

said first generally planar surface consists of an outside facing surface of a window pane.

5. A bird nesting apparatus, as claimed in claim 1, wherein:

said means for releasably attaching comprises suction cups.

6. A bird nesting apparatus as claimed in claim 1, wherein said covering means comprises:

an opaque cover defining said viewpod; and means for affixing said opaque cover to a second generally planar surface to support said opaque cover thereon in the first orientation.

7. A bird nesting apparatus, as claimed in claim 6, wherein said second generally planar surface consists of an inside facing surface of a window pane.

8. A bird nesting apparatus kit comprising:

an enclosed housing defining an interior area for a bird to nest therein, said housing including an opening to allow a bird to access said interior area, and a transparent housing pod on for viewing said interior area;

a perch positionable on said housing adjacent said opening;

mounting means for mounting said bird nesting apparatus to a selected mounting base; and opaque covering means for selectively opaquely covering said transparent housing portion in a first selected orientation and for uncovering said transparent housing portion in a second selected orientation for viewing said interior area, said opaque covering means having a view port therethrough so that said interior area is viewable through said transparent housing portion with said covering means in said first selected orientation so that said interior area can be viewed when said opaque covering means is in either said first selected orientation or said second selected orientation with minimal interference with the activity being viewed.

9. A bird nesting apparatus kit, as claimed in claim 8, wherein:

said transparent housing portion is generally flat.

10. A bird nesting apparatus kit, as claimed in claim 8, wherein:

said housing further includes a translucent housing portion to increase the visibility in said interior area through said transparent housing portion.

11. A bird nesting apparatus kit, as claimed in claim 8, wherein:

said mounting means comprises suction cups for releasably attaching said housing to a first generally planar surface to support said housing thereon.

12. A bird nesting apparatus kit, as claimed in claim 11, wherein said opaque covering means comprises:

a generally flexible opaque cover defining said viewport; and means for affixing said opaque cover to a second generally planar surface to support said opaque cover thereon in the first orientation.

13. A bird nesting apparatus kit, as claimed in claim 8, wherein:

said mounting means comprises an elongate post having one end attached to said housing.

14. A bird nesting apparatus kit, as claimed in claim 13, wherein said opaque covering means comprises:

a generally rigid opaque cover defining said viewport: and means for hingedly attaching said opaque cover to said housing to support said opaque cover in the first position.

15. A bird nesting system for viewing the activity of birds nesting therein comprising:

an enclosed housing defining an interior area therein, said housing comprising a front wall, opposed side walls, opposed top and bottom walls, and a transparent back wall providing viewing into said interior area;

an opening defined in said front wall sized and configured to allow a bird to pass therethrough to access said interior area;

a perch extending from said front wall adjacent said opening;

a frame extending about said transparent back wall;

a plurality of suction cups extending from said frame for releasably attaching said housing to an outside surface of a window pane; and opaque covering means for selectively opaquely covering said transparent housing portion in a first selected orientation and for uncovering said transparent housing portion in a second selected orientation for viewing said interior area, said opaque covering means having a view port therethrough so that said interior area is viewable through said transparent housing portion with said covering means in said first selected orientation so that said interior area can be viewed when said opaque covering means is in either said first selected orientation or said second selected orientation with minimal interference with the activity being viewed.

16. A bird nesting system, as claimed in claim 15, wherein said covering means comprises:

a generally flexible opaque cover defining said viewport; and means for hingedly affixing said generally flexible opaque cover to the inside facing surface of a window pane to support said opaque cover thereon.

* * * * *